Aug. 24, 1926.

E. N. HOWELL 1,597,198

AUTOMATIC CLUTCH DISCONNECTING MEANS

Filed Sept. 15, 1925   2 Sheets-Sheet 1

Aug. 24, 1926. 1,597,198
E. N. HOWELL
AUTOMATIC CLUTCH DISCONNECTING MEANS
Filed Sept. 15, 1925  2 Sheets-Sheet 2

Witnesses:
Walter Chism
George A. Gruss

Inventor:
Edward N. Howell
by Joshua R. H. Potts
his Attorney

Patented Aug. 24, 1926.

1,597,198

UNITED STATES PATENT OFFICE.

EDWARD NEVERSON HOWELL, OF PHILADELPHIA, PENNSYLVANIA.

AUTOMATIC CLUTCH-DISCONNECTING MEANS.

Application filed September 15, 1925. Serial No. 56,425.

My invention relates to automatic clutch disconnecting means especially adapted for use with mechanism for raising and lowering large rolling steel doors.

A rolling steel door installation consists of a steel door which may be rolled to be like a curtain shade, power-operated mechanism for rolling up and unrolling the door; hand-operated mechanism for the same purpose when the power-operated mechanism is rendered inoperative, and a clutch which connects and disconnects the hand-operated mechanism from the power-operated mechanism.

When the power-operated mechanism is inoperative, the hand-operated mechanism is connected thereto by the clutch for rolling up and unrolling the door. It frequently happens that when the power-operated mechanism becomes operative, the workman fails to disconnect the clutch. When it is started, its speed being several hundred times greater than the speed at which the hand-operated mechanism is capable of running, the hand-operated mechanism is broken and often damaged beyond repair. This is not only expensive but causes costly delays when the hand-operated mechanism is to be used again, as the damaged condition of the hand-operated mechanism is seldom discovered until it is to be used again.

The objects of my invention are to provide means for use with a clutch, such as mentioned above, for automatically disconnecting the same when the workman is through operating the hand-operated mechanism, and for keeping the clutch connected as long as the workman keeps the hand-operated mechanism under a strain.

These objects, and other advantageous ends which will be described hereinafter, I attain in the following manner, reference being had to the accompanying drawings in which—

Figure 1:
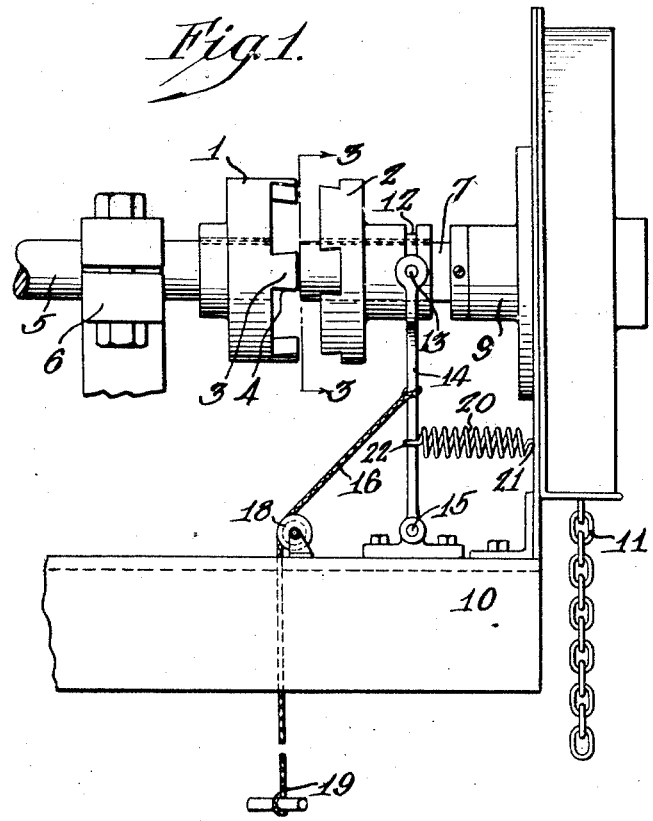
Figure 2:
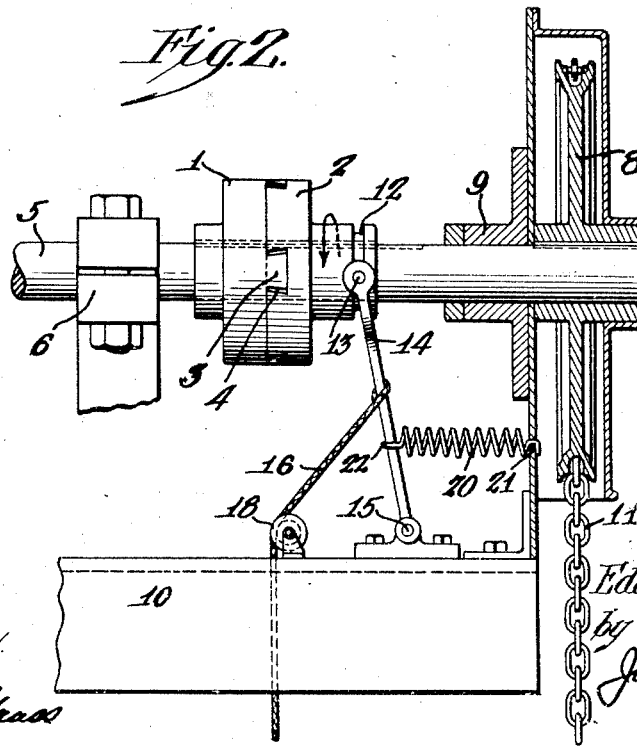
Figure 3:
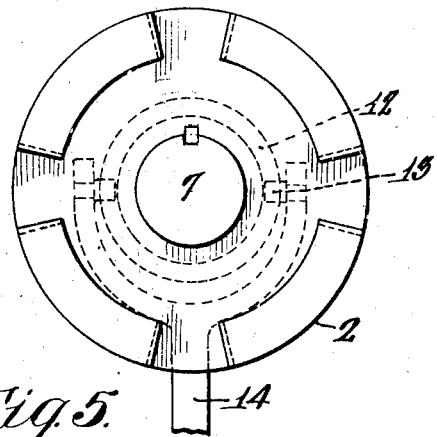
Figure 4:
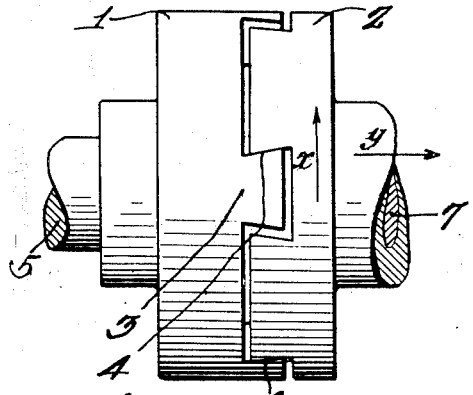
Figure 5:
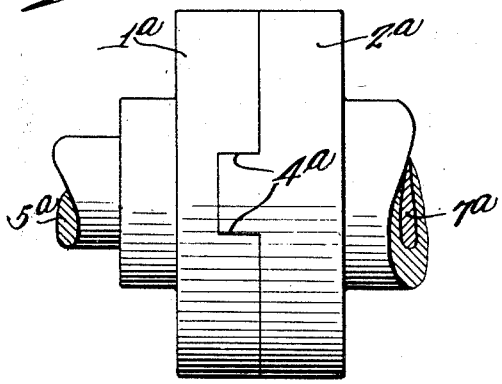
Figure 6:
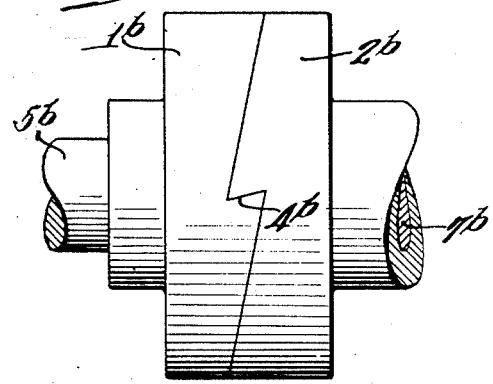
Figure 7:
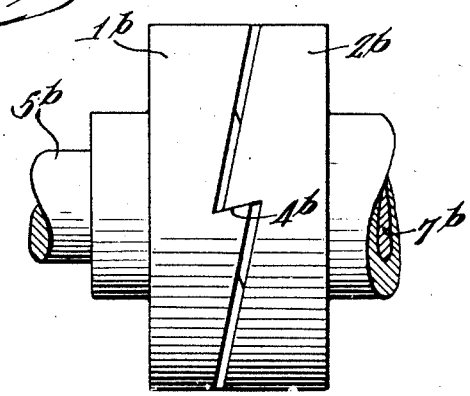
Figure 8:
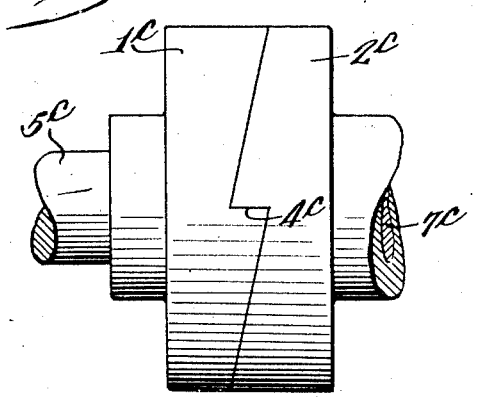

Figure 1 is a fragmentary side elevation of automatic clutch-disconnecting mechanism embodying my invention, showing the clutching members disengaged, Figure 2 a like view, partly in section, showing the clutching members engaged, Figure 3 a fragmentary section on line 3—3 of Figure 1, Figure 4 an enlarged fragmentary view of the clutching members showing the disconnecting action, Figures 5 and 6 modified forms of the clutching members shown in Figures 1 and 2, Figure 7 a view similar to Figure 6 showing the clutch-disconnecting action, Figure 8 another modified form of the clutching members.

Referring to the drawings, 1 and 2 indicate a pair of clutching members having inter-meshing projections 3 provided with clutching faces 4. The clutching faces 4 may be in a plane inclined to the axes of the members, as shown in Figures 1 to 4 and 7 and 8, when the load transmitted through the clutching members is light, or may be in a plane parallel to the axes when the load transmitted through the clutching members is heavy. Clutching member 1 is fixed to a driven shaft 5 rotatable in a suitable bearing 6. Shaft 5 may be connected to any mehanism, not shown, such as the mechanism for raising and lowering large roll steel doors. Clutching member 2 is slidably keyed on a shaft 7 having a chain wheel 8 keyed thereto and rotatable in a bearing 9. Bearing 9 is mounted on a suitable frame 10. A hand-operated chain 11 passes over wheel 8 for rotating the same.

Clutching member 2 is provided with an annular groove 12 in its hub, which receives pins 13 on the free ends of a yoked lever 14 pivoted to the frame at 15. A rope 16 has one end connected to the lever 14, passes over a pulley 18 on the frame and is adapted to be pulled by its other end 19 to swing lever 14 and move clutching member 2 into clutching engagement with clutching member 1. A spring 20 connected with the frame at 21 and the lever at 22, keeps a clutch-disengaging tension or pull on lever 14 and clutching member 2, and shifts the clutching member when free to do so, out of clutching engagement with member 1. The tension in spring 20 is insufficient, to overcome the friction produced between the clutching faces 4 by the power transmitted when chain 11 is pulled to rotate wheel 8, in order to disengage clutching member 2.

In Figure 5, I have shown the clutching faces 4ª as being in a plane parallel to the axes of the clutching members. In all respects the clutching members are similar to those shown in Figures 1 to 4 and I have therefore given corresponding parts similar reference characters with the exponent "a."

In Figures 6 and 7, I have shown a pair of clutching members of the one-way rotating type provided with clutching faces 4^b which are in a plane at an incline to the axis of the clutching members. In all other respects, these clutching members are similar to those shown in Figures 1 to 4 and I have therefore given corresponding parts similar reference characters with the exponent "b."

In Figure 8, I have shown clutching members of the one-way rotating type having clutching faces 4^c in a plane parallel to the axis of the clutching members. These clutching members are otherwise similar to those shown in Figures 1 to 4 and I have therefore given corresponding parts similar reference characters with the exponent "c."

To engage the clutching members and keep them engaged, the end 19 of the rope is pulled downwardly to swing lever 14 and shift clutching member 2 so that its projections will intermesh with the projections of clutching member 1, as shown in Figure 2. Chain 11 is then pulled to rotate wheel 8 in either direction and cause the adjacent clutching faces 4 to engage each other. The stress transmitted from the chain to the faces is such that the friction between the faces is sufficient to prevent spring 20 from shifting member 2 out of clutching engagement. When the resistance offered to rotation by shaft 5 is small, a light stress will be transmitted from chain 11 to the clutching faces. In a case of this kind the faces are preferably inclined as shown in Figures 1 to 4 to aid in producing sufficient friction to overcome the tension of spring 20. When the resistance offered by shaft 5 is great, the stress transmitted from chain 11 to the clutching faces is also great. In a case of this kind the clutching faces 4^a shown in Figure 5 are used. These clutching faces lie in a plane parallel to the axis of the clutching members. After sufficient rotation has been transmitted to shaft 5 to bring about the desired result, the workman releases the chain. Upon the release of the chain, the pressure between the clutching faces 4 or 4^a disappears, and also the friction, so that spring 20 is free to shift the clutching member 2 out of clutching engagement to the position shown in Figure 1. During this movement the clutching member 2, if provided with inclined faces 4, will rotate slightly in the direction of the arrow x, shown in Figure 4, as member 2 is shifted in the direction of the arrow y. When the non-inclined faces shown in Figure 5 are used, this backward rotation indicated by the arrow x is not present.

The clutching members shown in Figures 6-8 function similarly to the clutching members shown in Figures 1 to 5 with the exception that they are capable of clutching for rotation in one direction only.

It will be seen that with clutching members provided with the mechanism, and operated as above set forth, a simple and efficient means is provided for automatically disconnecting the clutching members when the workman releases the chain 11. This avoids the danger of the workman failing to disconnect the clutch and thus causing breakage of the parts when shaft 5 is rotated by power-driven means at a greater speed than the hand-operated parts are capable of withstanding.

While I have described my invention as taking a particular form, it will be understood that the various parts may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. In a device of the class described, a driven shaft adapted to be connected to actuating mechanism and a shaft in alinement therewith, in combination with a clutch member fixed to the first said shaft and a clutch member feathered to the second mentioned shaft, resilient means for keeping a clutch-disconnecting tension on the second clutch member and means on the second mentioned shaft for rotating the same to maintain sufficient friction between the engaging faces of said clutch members to overcome the clutch-disconnecting tension, substantially as described.

2. In a device of the class described, a shaft adapted to connect to operating mechanism and a shaft in alinement therewith, a clutch member fixed to the first said shaft, and a clutch member feathered to the second mentioned shaft, a lever pivoted adjacent the second mentioned clutch member and operatively connected thereto, resilient means constantly exerting tension on said lever to disconnect said clutch members, and means on the second mentioned shaft for rotating the same to produce and maintain sufficient friction between the faces of the clutch members to overcome the clutch disconnecting tension of said resilient means, substantially as described.

3. In a device of the class described, a shaft adapted to connect to operating mechanism and a shaft in alinement therewith, a clutch member fixed to the first said shaft, and a clutch member feathered to the second mentioned shaft, a lever pivoted adjacent the second mentioned clutch member and operatively connected thereto, resilient means constantly exerting tension on said lever to disconnect said clutch members, a chain pulley and actuating chain on the second mentioned shaft for rotating the same to produce and maintain sufficient friction between the faces of the clutch members to overcome the clutch disconnecting tension of said resilient means, and means connected to said lever and adjacent to said chain for initially throwing said clutch members into engagement, substantially as described.

In testimony whereof I have signed my name to this specification.

EDWARD NEVERSON HOWELL.